(12) United States Patent
Palmer et al.

(10) Patent No.: US 7,584,503 B1
(45) Date of Patent: Sep. 1, 2009

(54) FEDERATING TRUST IN A HETEROGENEOUS NETWORK

(75) Inventors: Matthew A. Palmer, Menlo Park, CA (US); Andrew Richard Harding, Scotts Valley, CA (US); Jason P. Poirier, Bedford, NH (US); Theron Tock, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 887 days.

(21) Appl. No.: 11/061,641

(22) Filed: Feb. 22, 2005

(51) Int. Cl.
*G06F 17/30* (2006.01)
(52) U.S. Cl. .................................. 726/9; 726/3; 726/5
(58) Field of Classification Search ............ 726/3, 726/5, 9
See application file for complete search history.

(56) References Cited

U.S. PATENT DOCUMENTS

| | | |
|---|---|---|
| 6,986,061 B1 | 1/2006 | Kunzinger |
| 7,174,456 B1 | 2/2007 | Henry et al. |
| 2003/0177389 A1 | 9/2003 | Albert et al. |
| 2004/0230797 A1 | 11/2004 | Ofek et al. |
| 2006/0075263 A1 | 4/2006 | Taylor |
| 2007/0101405 A1 | 5/2007 | Engle et al. |

OTHER PUBLICATIONS

RSA Press Release, Nov. 9, 2004, RSA Security and Juniper Networks Extend Strategic Partnership to Offer New Federated Identity Management Solution.*

Claims of co-pending U.S. Appl. No. 10/917,338, filed Aug. 13, 2004, entitled "Method and System for Performing A Security Check," Theron Tock et al., 13 pages.

* cited by examiner

*Primary Examiner*—David Y Jung
(74) *Attorney, Agent, or Firm*—Harrity & Harrity, LLP (57) ABSTRACT

A check of a processing device is performed. A device may receive a network access request to access a network from a first processing device. A security check may be caused to be performed on the first processing device. Whether to grant the network access request to the first processing device is based on a result of the security check.

25 Claims, 7 Drawing Sheets

FEDERATING TRUST IN A HETEROGENEOUS NETWORK

TECHNICAL FIELD

The principles of the invention relate generally to computer security and, more particularly, to performing a check on a processing device before permitting the processing device to access a network and while the processing device is accessing a network.

BACKGROUND OF THE INVENTION

Many network users have processing devices that are affected by security threats, such as viruses, spyware, trojan horses, or other malicious software (Malware). Some processing devices have antivirus software, personal firewall software, or other security products installed, but may not update these products or ever use them. Other processing devices may not have any security products installed. Thus, many network users may have processing devices that are vulnerable to a number of security threats, such as hackers who may cause harm to the processing devices, or may steal personal information stored on the processing devices resulting in identity theft or other harm to the users. Further, such processing devices may execute malicious software that may disable service provider networks, thereby causing possible financial loss to service providers as well as to network users.

SUMMARY OF THE INVENTION

In one aspect, a method includes receiving an access request to access a network from a first device, causing a security check to be performed on the first device in response to receiving the access request, and determining whether to grant the access request or redirect traffic from the first device based on a result of the security check.

In another aspect, a system is provided. The system may include at least one component. The at least one component is configured to cause a security check to be performed on a user device, and redirect traffic from the user device to a portal when the security check indicates that the user device is not in conformance with a security policy. The portal presents a user, via the user device, an option to purchase or update a security product.

Another system may include means for causing a security check to be performed on a user device before permitting the user device to access a network, means for redirecting traffic from a user device to a portal when a result of a security check indicates that the user device is not in conformance with a security policy, and means for providing a user, via a user device, an option to purchase a security product, update a security product, or continue accessing the network without purchasing or updating the security product.

Another method may include receiving a network access request at a service provider device from a user device, and determining, via the service provider device, whether to grant the network access request based on a security feature associated with the user device.

In yet another aspect, a computer-readable medium having instructions recorded thereon is provided. The instructions may include a first group of instructions to cause a processor to be configured to receive a network access request from a user device, and a second group of instructions to cause a processor to determine whether to grant the network access request based on a security feature associated with the user device.

In yet another method, a network access request may be received at a service provider device from a user device, and cause, via the service provider device, a security scan of the user device to be performed in response to receiving the network access request.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Figure 1A:
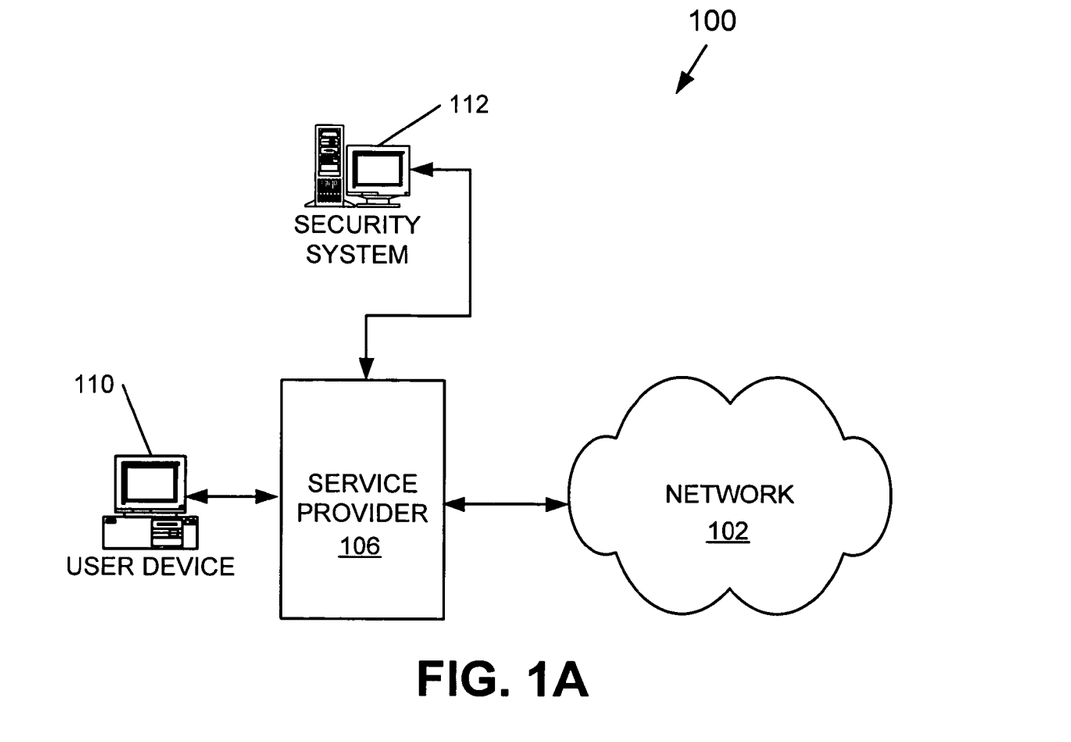
FIG. 1A illustrates an exemplary system consistent with principles of the invention.

FIG. 1A illustrates an exemplary system 100 consistent with the principles of the invention. System 100 may include a network 102, a service provider (SP) 106, a user device 110 and an intrusion security system 112.

User device 110 may be a processing device, such as a personal computer (PC), a wireless telephone, a personal digital assistant (PDA), a laptop, or another type of computational or communication device. In some implementations, user device 110 may execute web browser software, such as, for example, Microsoft Internet Explorer, available from Microsoft Corporation of Redmond, Wash., for communicating with SP 106. User device 110 may connect to SP 106 via a wired, wireless, or optical connection.

Network 102 may include a local area network (LAN), a wide area network (WAN), a telephone network, such as the Public Switched Telephone Network (PSTN), a wireless network, an intranet, the Internet, a similar or dissimilar network, or a combination of networks.

Figure 1B:
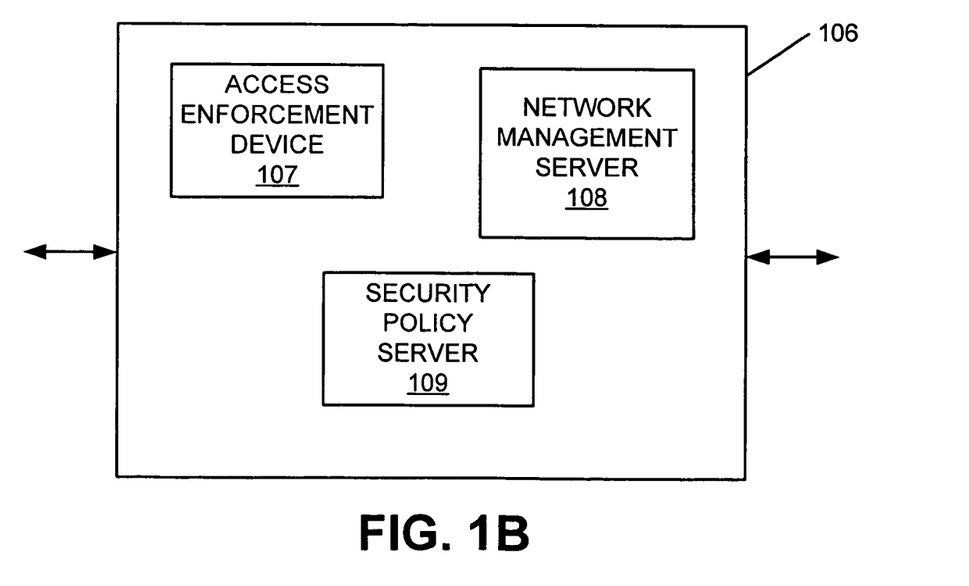
FIG. 1B illustrates an exemplary implementation of a service provider that may be used in the system of FIGS. 1A and 1B.

SP 106 may include one or more devices that provide user device 110 with access to network 102. FIG. 1B illustrates one implementation of SP 106, consistent with the principles of the invention. SP 106 may include an access enforcement device 107, a network management server 108, and a security policy server 109.

Access enforcement device 107 may be, for example, a digital subscriber line (DSL) aggregator, a wireless aggregator, or other similar devices for receiving input from and providing output to devices, such as user device 110, attempting to access network 102. Further, access enforcement device 107 may receive access requests from a number of user devices, such as user device 110, via, for example, a DSL line, a wireless connection, a public switched telephone network (PSTN), or other means. Output to the user devices may be directed to each of the user devices via access enforcement device 107.

Network management server 108 may be a device that can audit user devices for compliance with a security policy such as, for example, a security policy that dictates that each user device contain installed and updated antivirus software. In some implementations, network management server 108 may cause a user device that is not in compliance with the security policy to be denied network access or permitted limited access. In one implementation, network management server 108 may redirect a user device that is not in compliance with the security policy to a network location that may permit a user to load and install a security update on the user device or to purchase and install a security product on the user device.

In implementations consistent with the principles of the invention, security policy server 109 may be configured to cause a security checker and a security module to be installed on a user device, such as user device 110. Once installed on the user device, the security checker may execute the security module, which may perform a security check or scan of the user device and report a result of the scan to security policy server 109. A mechanism for performing such a security check is described in U.S. patent application Ser. No. 10/917,338, entitled "METHOD AND SYSTEM FOR PERFORMING A SECURITY CHECK," filed on Aug. 13, 2004 and herein incorporated by reference in its entirety.

In response to receiving the result of scanning or checking user device 110, security policy server 109 may inform network management server 108 of the result. Based on the result, network management server 108 may inform access enforcement device 107 to grant full access, grant limited access, deny access, or redirect a user device to a web page or portal that may provide the user an opportunity to purchase a security product or load a security product update for the user device.

It will be appreciated that a single device may perform the functions of access enforcement device 107, network management server 108, and/or security policy server 109 in other implementations consistent with the principles of the invention.

System 100 of FIG. 1A may include a statistics collector (not shown) that may request and receive traffic statistics from devices such as, for example, access enforcement device 107 of FIG. 1B. In one implementation consistent with the principles of the invention, the statistics collector may be implemented within network management server 108. In other implementations consistent with the principles of the invention, the statistics collector may be implemented in security policy server 109 or in another network device. The received statistics may be maintained and stored on a user or subscriber basis and may later be examined and analyzed to determine a typical amount of traffic in the network, such as for a subscriber or a group of subscribers. The statistics may be collected periodically over a specific time period, such as, for example, every 25 minutes or any other time period.

Based on the analysis, a network administrator or automated agent, such as a software daemon executing in the network or in SP 106, may set a traffic threshold associated with a user or subscriber or groups of users or subscribers. The traffic threshold may be an amount of traffic that is not expected to be exceeded based on the analysis of traffic for a particular subscriber. In some implementations, multiple thresholds may be set for various users to track different applications. For example, the network administrator or automated agent may set a traffic threshold for a subscriber for subscriber traffic passing through a specific TCP port, which may be used for a remote printer application. The network administrator or automated agent may set other traffic thresholds with respect to a subscriber's traffic passing through other physical or logical ports.

Assuming, for the sake of example, that the statistics collector is implemented within network management server 108, upon detection of a subscriber threshold being reached or exceeded, network management server 108 may send a command to access enforcement device 107 to redirect the traffic for that subscriber to intrusion security system 112.

Intrusion security system 112 may be a conventional security system to enforce security policies, such as an intrusion detection device modified to interface with network management server 108, access enforcement device 107, or other components of system 100. Intrusion security system 112 may analyze subscriber traffic flows and determine whether excessive traffic is being generated as a result of a virus, worm, or other malicious activity occurring in user device 110. Intrusion security system 112 may send a response to a network device, such as, for example, network management server 108 reporting whether the excess traffic is the result of malicious activity. Depending on the report from intrusion security system 112, network management server 106 may redirect the traffic to its original path or may redirect the traffic to a portal, which may inform the subscriber of existence of the detected malicious activity.

It will be appreciated that system 100 may have more or fewer components than shown in FIGS. 1A and 1B. For example, system 100 may include multiple security policy servers, network management servers, access enforcement devices, intrusion security systems, SPs, or user devices.

Figure 2:
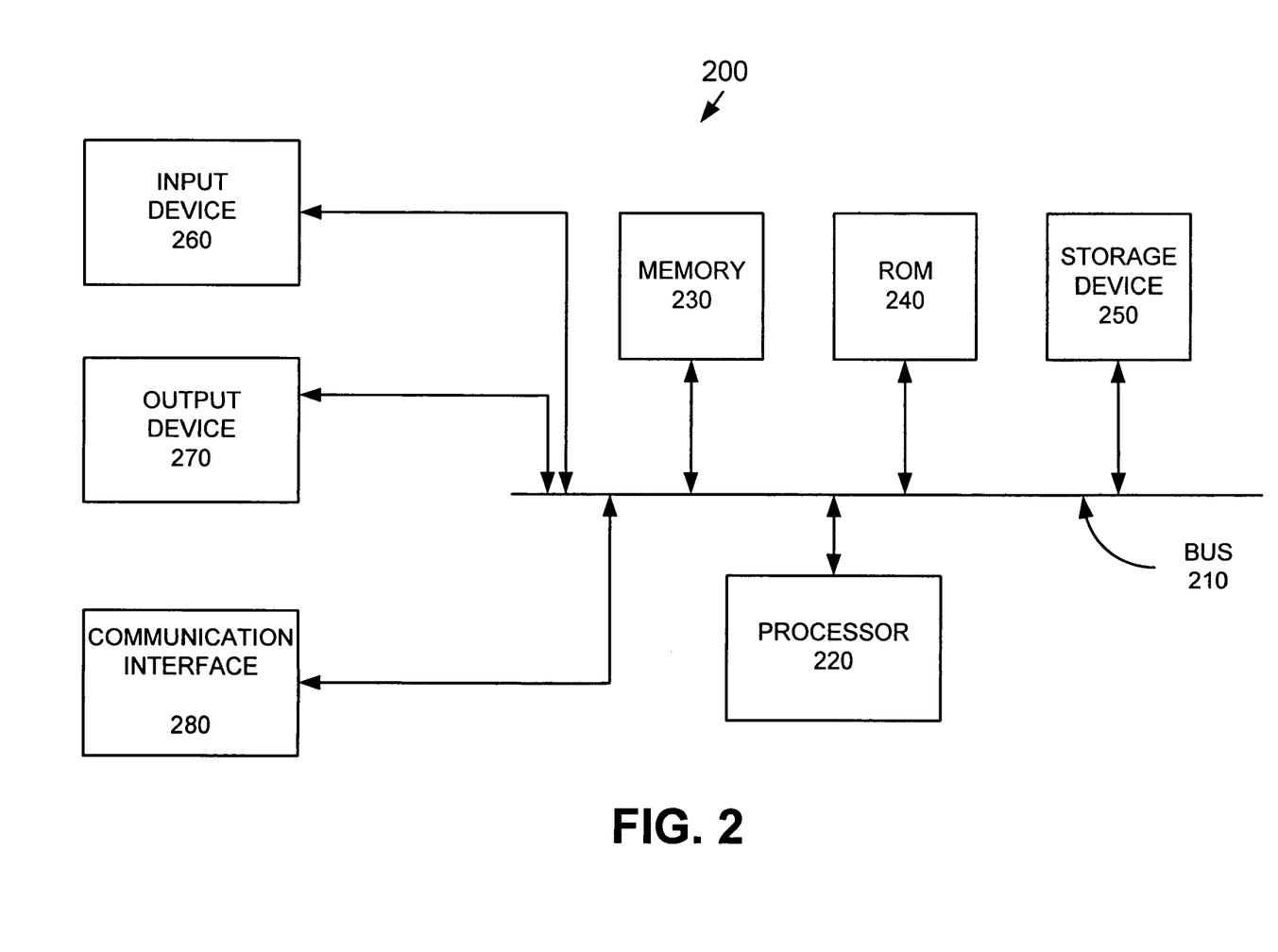
FIG. 2 is a functional block diagram of a processing device that can be used to implement a server, an access enforcement device, an intrusion detection system and/or a user device shown in FIG. 1.

FIG. 2 is a functional block diagram that illustrates a processing device 200 that may be used to implement user device 110, access enforcement device 107, network management server 108, security policy server 109, or intrusion security system 112. Device 200 may include a bus 210, a processor 220, a memory 230, a read only memory (ROM) 240, a storage device 250, an input device 260, an output device 270, and a communication interface 280. Bus 210 may permit communication among the components of device 200.

Processor 220 may include one or more conventional processors or microprocessors that interpret and execute instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of magnetic or optical recording medium and its corresponding drive, such as a magnetic disk or optical disk and its corresponding disk drive.

Input device 260 may include one or more mechanisms that permit a user to input information to system 200, such as a keyboard, a mouse, a pen, a biometric mechanism, such as a voice recognition device, etc. Output device 270 may include one or more mechanisms that output information to the user, including a display, a printer, one or more speakers, etc. Communication interface 280 may include any transceiver-like mechanism that enables device 200 to communicate via a network. For example, communication interface 280 may include a modem or an Ethernet interface for communicating via network 102. Alternatively, communication interface 280 may include other mechanisms for communicating with other networked devices and/or systems via wired, wireless or optical connections.

Device 200 may perform functions in response to processor 220 executing sequences of instructions contained in a computer-readable medium, such as memory 230, ROM 240, storage device 250, or some combination of these. A computer-readable medium may include one or more memory devices and/or carrier waves. Such instructions may, for example, be read into memory 230 from another computer-readable medium, such as storage device 250, or from a separate device via communication interface 280.

Execution of the sequences of instructions contained in memory 230 may cause processor 220 to perform certain acts described herein. In alternative implementations, hard-wired circuitry may be used in place of or in combination with software instructions to implement aspects consistent with the principles of the invention. Thus, implementations consistent with the principles of the present invention are not limited to any specific combination of hardware circuitry and software.

Exemplary Processing

Figure 3:
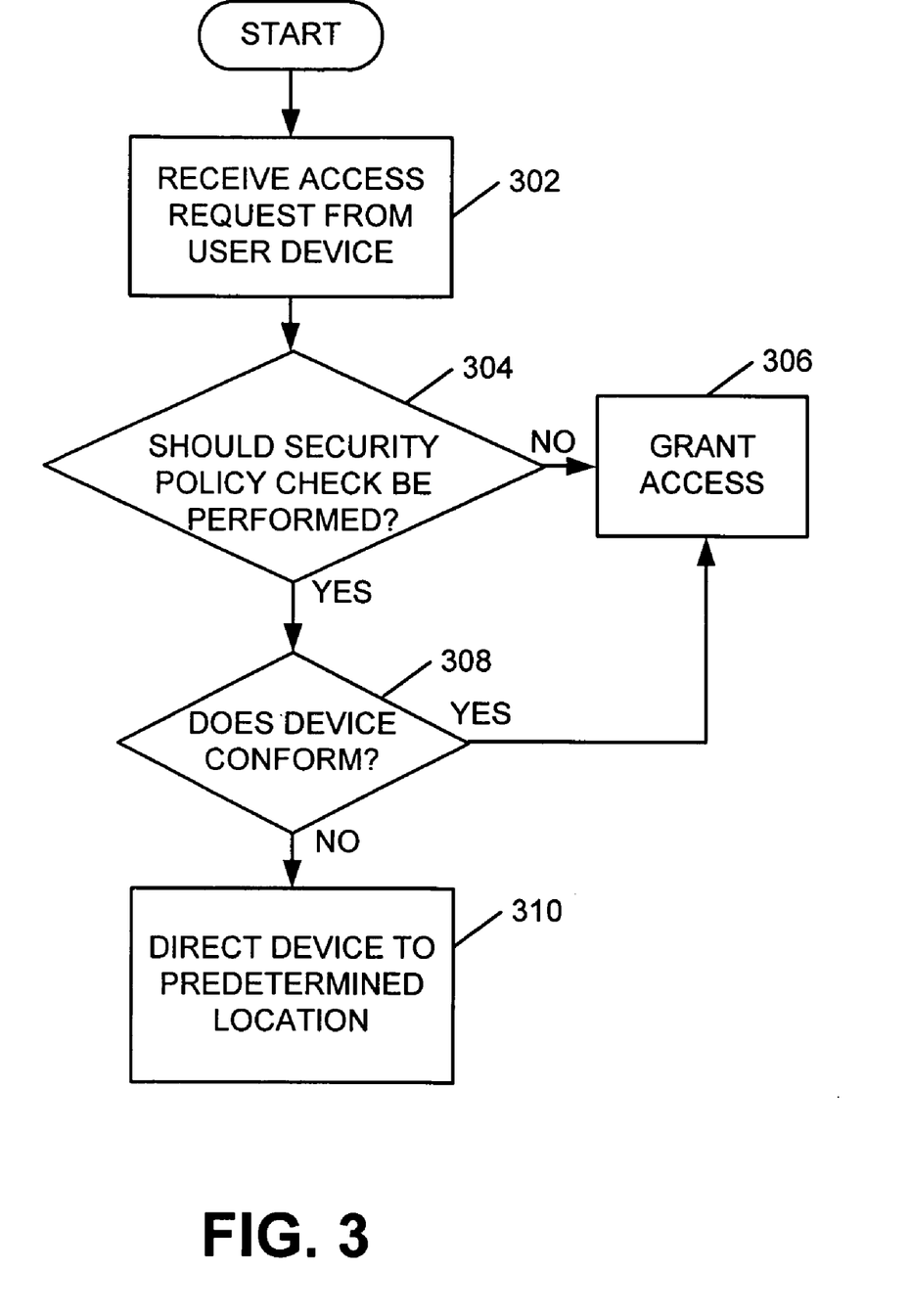
FIG. 3 is a flowchart that illustrates exemplary processing within the system of FIG. 1 consistent with the principles of the invention.

FIG. 3 is a flowchart that illustrates exemplary processing in system 100, consistent with the principles of the invention. The process may begin with SP 106 receiving a network access request from user device 110 (act 302). The access request may include, among other things, information that identifies user device 110. SP 106 may determine whether a security policy check should be performed (act 304). In some implementations consistent with the principles of the invention, a security check may not be performed every time user device 110 requests access to network 102. The security check may be performed after a predetermined period of time, for example, one week, one month, or any other suitable time period. Alternatively, the security check may be performed after an event, such as a virus outbreak. If a security policy check is not to be performed, then user device 110 may be granted access to network 102 (act 306). Otherwise, SP 106 may determine whether user device 110 conforms to a security policy (act 308). The security policy may, for example, indicate that user device 110 should include a latest copy of virus signatures.

Different security policies may be used depending on a number of different factors. For example, security policy 1 may be used for a particular user or group of users, security policy 2 may be used for user device 110 accessing SP 106 from a particular location or group of location, or security policy 3 may be used only for a particular type of user device 110, for example, a PDA.

In one implementation, SP 106 may analyze the result of the security check to determine whether user device 110 conforms to the security policy (act 308). In another implementation, SP 106 may analyze the result of the security check and determine whether user device 110 is fully in conformance with the security policy (security software executing and is latest version), partially in conformance with the security policy (security software executing, but not latest version), or not in conformance with the security policy (security software not present).

SP 106 may then permit full access to user device 110 when user device 110 fully conforms to the security policy (act 306) or may redirect user device 110 to a predetermined network location or portal that may provide the user with an opportunity to purchase a security product that may bring user device 110 to full conformance with the security policy when the product is installed and executed (act 310). In some implementations, if the user decides not to purchase the security product, the user may be permitted to indicate a desire to access network 102 without the security product. In other implementations, user device 110 may be permitted limited access when user device 110 is determined to not conform or be in partial conformance with the security policy, as discussed above.

Figure 4:
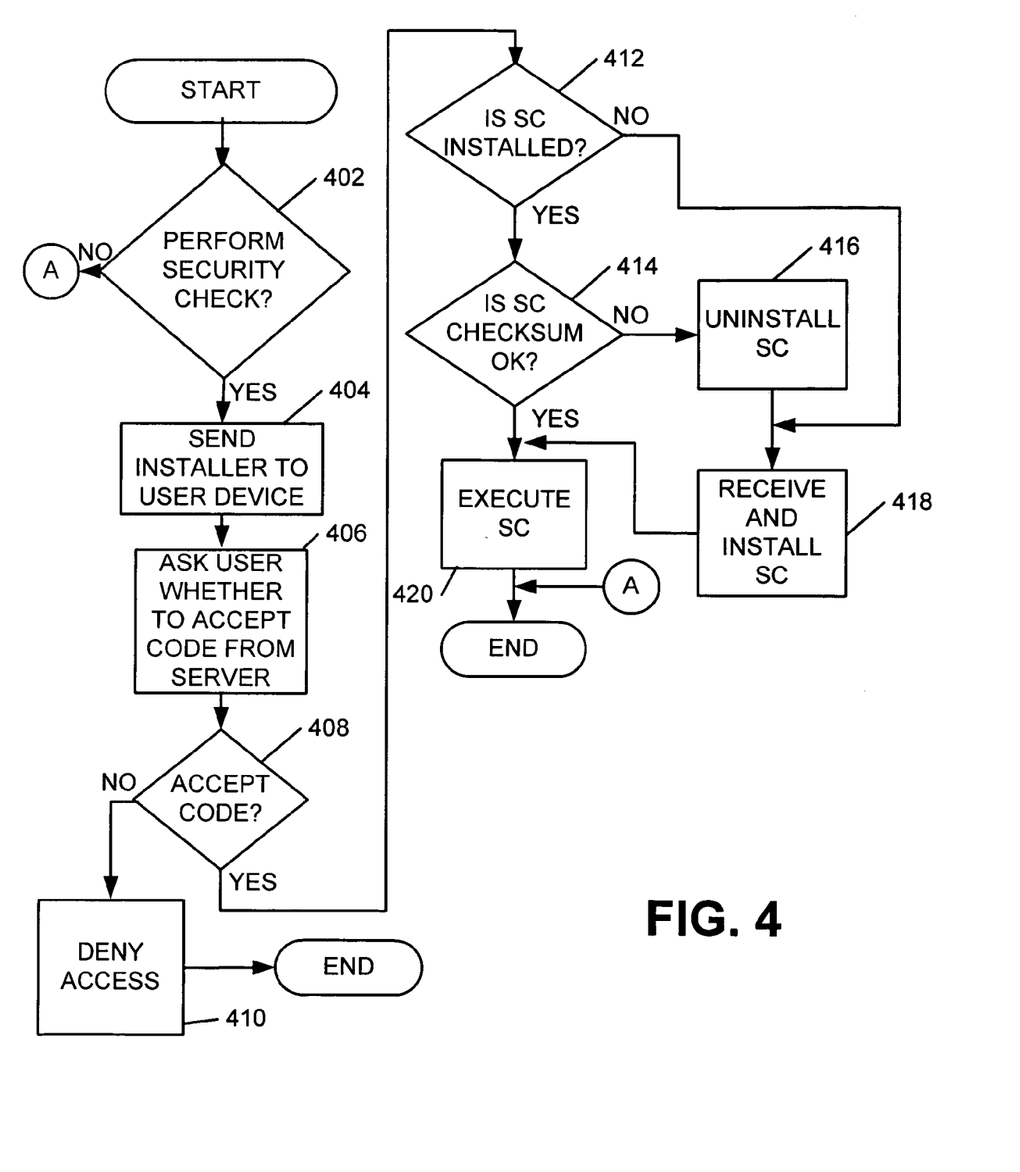
FIG. 4 is a flowchart that illustrates exemplary processing of a server consistent with the principles of the invention.

FIG. 4 is a flowchart of exemplary processing for causing a security checker to be installed on user device 110 in an implementation consistent with the principles of the invention. To determine whether user device 110 conforms with a security policy, SP 106 may check whether a security policy check of user device 110 should be performed (act 402), using, for example, a security policy "antivirus" that indicates that user device 110 should include antivirus software and a latest copy of virus signatures. The policy, "antivirus," may be associated with a security module, such as, for example, an antivirus scanner. Thus, using the above example, user device 110 may be required to undergo a security check according to a security policy, "antivirus," which, in this case, may determine whether antivirus software is installed, updated and executing on user device 110.

If a security check is to be performed, SP 106 may send an installer to user device 110 (act 404). An exemplary installer may be, for example, an ActiveX® installer available from Microsoft Corporation of Redmond, Wash. The installer on user device 110 may cause a message to be displayed on a display of user device 110 asking the user to accept software from security policy server 109 (act 406). The installer executing on user device 110 may receive the user's answer and may determine whether the user indicated that he or she accepts the software (act 408). If the user indicated that he or she will not accept the software, SP 106 may deny the user access to network 102 (act 410). In some implementations consistent with the principles of the invention, a message may be displayed to the user, via user device 110, indicating that the user will be denied access unless he or she indicates that the software from SP 106 is accepted.

If the user accepts software from SP 106, the installer may then determine whether a security checker (SC) is already installed (act 412). The installer may make this determination by, for example, checking registration keys stored on user device 110. If a security checker is installed, then the installer may compare a checksum of the installed security checker with that of the security checker to be loaded by SP 106 (act 414). In some implementations consistent with the principles of the invention, parameters, such as the security checker checksum, may be sent to user device 110 with the installer. If the checksums do not match, then the installer may uninstall the security checker currently installed on user device 110 (act 416), request the new security checker from SP 106, and receive and install the new security checker (act 418). Otherwise, if the checksums match, then the installed security checker may be executed on user device 110 (act 420).

Figure 5:
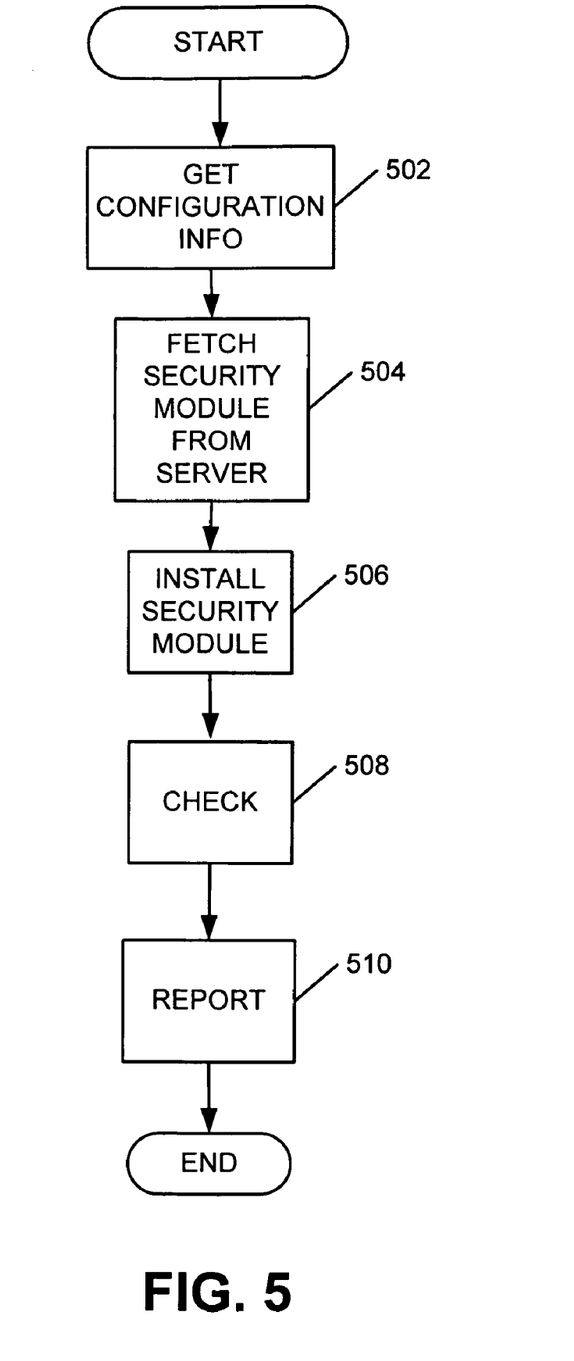
FIG. 5 is a flowchart that illustrates exemplary processing of a security checker.

FIG. 5 is a flowchart that illustrates processing of an exemplary embodiment of a security checker executing on user device 110. The security checker may provide a framework by which the security module, which can include software for detecting installation and execution of security software (for example, antivirus software, spyware detector software, key logger detector software, etc.), may be executed and by which the security module may report results to SP 106. Once the security checker is installed and begins executing, the security checker may request configuration information from the installer (act 502). The configuration information may include, for example, the security module, checksums of software modules to be loaded, and any other information necessary to perform the desired security check of user device 110. The configuration information may be stored on SP 106 in an archive file or in a database accessible by SP 106. When the installer is loaded into user device 110, the installer may include parameters such that the installer may later request the proper security checker, the security module, and any other needed files, such as operating system dependent files.

Figure 6:
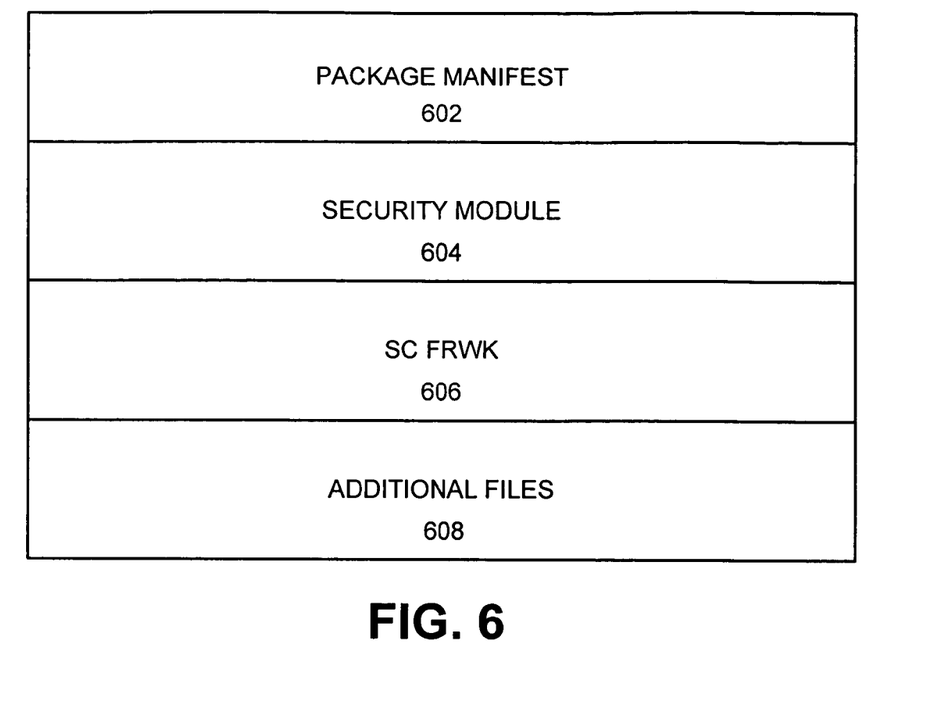
FIG. 6 illustrates an exemplary format of a file that includes configuration information.

FIG. 6 illustrates an exemplary format of an archive file that may include the configuration information. The archive file may be in a compressed format, such as, for example, Java® ARchive (JAR) format, which is well known to those of ordinary skill in the art. The archive file may include a package manifest 602, a security module 604, a security checker (SC) with a framework (FRWK) 606, and additional files 608.

Package manifest 602 may include a package definition, which may include the name of the security module 604 as well as other information. For example, the package definition may include a security checker (SC) interface version number, such as, for example, 1.0, the name of a provider of the security module, such as, for example, SnakeOil, Inc., the name of a file including the security module, for example, foo.bar, and checksums, such as, for example, an MD5-Digest or any other suitable type of checksum for each entry in the archived file, for example, a checksum for SC FRWK 606, security module 604, and additional files 608. The package definition may also include a configured time interval indicating a number of time units between repeated security checks of user device 110. The time units may be in seconds, minutes, hours or any other time unit.

Security module 604 may include one or more names of policies supported by the security module, such as, for example, spyware, antivirus, key-logger, or trojans. In one implementation, each policy may include a number of entries. The entries may include keywords that instruct SP 106 how to interpret a report provided by the security module after performing a security check on user device 110.

SC FRWK 606 may include the security checker code, and a framework, which may include an interface for the security checker to call routines of the security module, and an interface by which the security module may call routines to perform certain functions on user device 110.

Additional files 608 may include signature files, such as, for example, virus signature files for an antivirus program, or routines that may be operating system dependent, for example, one or more routines that the security module may use when executing on a user device that uses a particular operating system, such as, for example, the Windows XP® operating system, available from Microsoft Corporation of Redmond, Wash.

Figure 7:
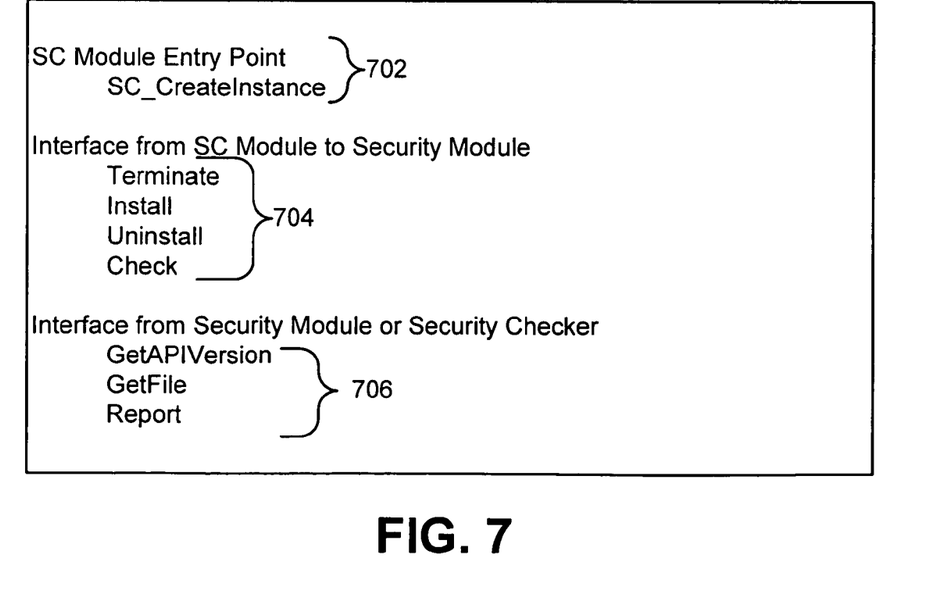
FIG. 7 illustrates an exemplary security checker framework consistent with the principles of the invention.

FIG. 7 illustrates exemplary security checker framework or interface definitions that may be used in implementations consistent with the principles of the invention. The interface definitions may include an entry point 702 for the security checker, an interface 704 from the security checker to the security module, and an interface 706 from the security module to the security checker.

Security checker entry point 702, may be named, for example, SC_CreateInstance. In one implementation, SC_CreateInstance may be a function, defined within the security module, which may be called to initialize entry points used by both the security checker and the security module.

Interface 704 from the security checker to the security module may include addresses of entry points within the security module, as well as other functions. For example, the security checker may call a Terminate routine, a routine within the security module to execute and perform any required cleanup operations. After the security module is installed, the security checker may call an Install routine, a routine within the security module to perform other installs related to the security module on user device 110. When the security checker calls an Uninstall routine, the security checker may uninstall the security module and related software. When the security checker calls a Check routine, a security scan of user device 110 may be performed. The security scan may be one or more of an antivirus scan, a spyware scan, a key-logger scan, etc.

Interface 706 from the security module to the security checker may include addresses of entry points of functions within the security checker that can be called from the security module. For example, the security module may call a GetAPIVersion routine to obtain a version of the security checker, for example, 1.0, from the security checker. This may be useful when multiple versions of the security checker exist, which may include different entry points and capabilities. Thus, the security module may check the security checker version number to determine which entry points and functions are available. The security module or the security checker may call a GetFile routine when a particular file is to be retrieved from SP 106. The GetFile routine may include parameters, such as, for example, full source and destination paths, indicating, respectively, a particular folder and file on a medium such as, for example, a disk, from which to get the file on SP 106 and a particular folder and file on, for example, a disk, where the file will be stored on user device 110. Thus, the GetFile routine may request and receive the file from SP 106. The security module may call a Report routine, after performing a security scan of user device 110, to report the results of the security scan to SP 106. The report may include a Boolean value indicating whether the scan was successful, and a policy name associated with the security module, such as, for example, antivirus, key-logger, spyware, etc. Other information may also be included in the report, such as, for example, a version of security software found on user device 110.

Returning to FIG. 5, when the installer is loaded into user device 110, SP 106 may provide parameters, including information about the archive file, with the installer. After retrieving configuration information, the security checker may fetch the security module from SP 106 by calling GetFile (act 504) via the security checker framework. The security checker may then use the installer to install the security module (act 506). The security checker may then call Check, through interface 704, to cause the security module to execute on user device 110 and perform, for example, a security check of user device 110 (act 508). A policy may be associated with the security module. Thus, for example, if policy "antivirus," is associated with a security module, the security module, associated with the "antivirus" policy, may perform a scan of memory and/or files on user device 110 to determine whether a latest version of antivirus software is installed and executing on user device 110 or to identify the version of antivirus software that is installed. The security module may call Report, through interface 706, to report the results of the scan to SP 106 (act 510). The security checker may call Terminate through interface 704 to perform any cleanup tasks according to a routine within the security module.

After being installed by the security checker, the security module may be executed and begin by performing checks to determine whether any additional files may be needed from SP 106. For example, the security module may need certain files for particular operating systems. If additional files are needed, the security module may call the GetFile routine, through interface 706, to request and receive the needed file or files from SP 106 and may then install the file or files.

As mentioned above, after performing a security scan or check on user device 110, the security module may send a report to SP 106, by calling Report via interface 706 to indicate a result of the scan to SP 106. The report may vary depending on the type of security check performed. For example, a report after performing an antivirus scan may indicate that antivirus software is executing on user device 110, but is not the latest version. SP 106 may receive the report and may determine a level of access to which user device 110 will be granted based on the report, or whether user device 110 may be redirected to a predetermined network location (e.g., a web page) or portal that may provide the user with an opportunity to purchase a security product, such as, for example, antivirus software, spyware detection software, firewall software, or any other security product. The levels of access may include, for example, no access, limited access (for example, access to only certain network locations), or full access. In one implementation, SP 106 may deny access to user device 108 if the report indicates that user device 110 is not executing antivirus software. In an alternative implementation, SP 106 may grant limited or full access to user device 110 depending on whether user device 110 is executing a latest version of a particular security product or a recent, but not the latest, version of the particular security product.

Security Checker Configuration on Server

SP 106 may be provided with an administrative interface to provide an administrator the ability to configure one or more security modules and security policies. Each security module may be associated with a security policy, which may, as set forth above, cause a variety of security checks to be performed on user device 110. For example, an administrator may associate a security module with a policy for checking user device 110 for the presence of antivirus software.

Other types of security policies may be associated with a security module to perform various other checks, such as, for example, checking a version of the operating system (this may be achieved by, for example, checking registration keys), checking for the presence of firewall software, checking a patch level of certain software modules, etc.

The administrative interface may provide the administrator with a way to specify actions that are permitted after user device 110 is scanned. For example, based on the report to SP 106, the user may be given unlimited access (for example, when the user device is in conformance with the security policy), the user may be permitted access to only certain resources of network 102 (for example, when the user device is partial conformance with the security policy), or the user may denied any access (for example, when the user device is not in conformance with the security policy).

In some implementations consistent with the principles of the invention, the security module may send a report to SP 106 only when the report differs from a previous report.

In implementations consistent with the principles of the invention, the security checker may periodically check whether the security policy configured on SP 106 for user device 110 has changed. If the security checker executing on user device 110 detects a configuration change, the security checker, the security module, and any associated files may be uninstalled on user device 110 and a new security checker, security module, and associated files may be loaded and installed.

In implementations consistent with the principles of the invention, system 100 may not perform security policy checks on user device 100 every time a user accesses the system. Instead, the network administrator may configure security policy checks to be performed periodically on user devices 110, for example, weekly, monthly, or any other suitable time period. Some implementations, provide the network administrator with a capability to configure, for example, SP 106, such that SP 106 may check all user devices 110 when they next request access to network 102. This feature may be useful after a virus or worm outbreak.

Traffic Volume Checking

As mentioned above, traffic statistics may be collected from network devices, such as, for example, access enforcement device 107 or other network devices, on a per subscriber basis. The traffic statistics may further indicate an amount of traffic over a specific time period, for example, every 25 minutes, for a particular application, logical port, for example, TCP port, or a physical port. In some implementations, SP 106 may collect and analyze the statistics. In other implementations, other devices may collect and analyze the statistics.

Figure 8:
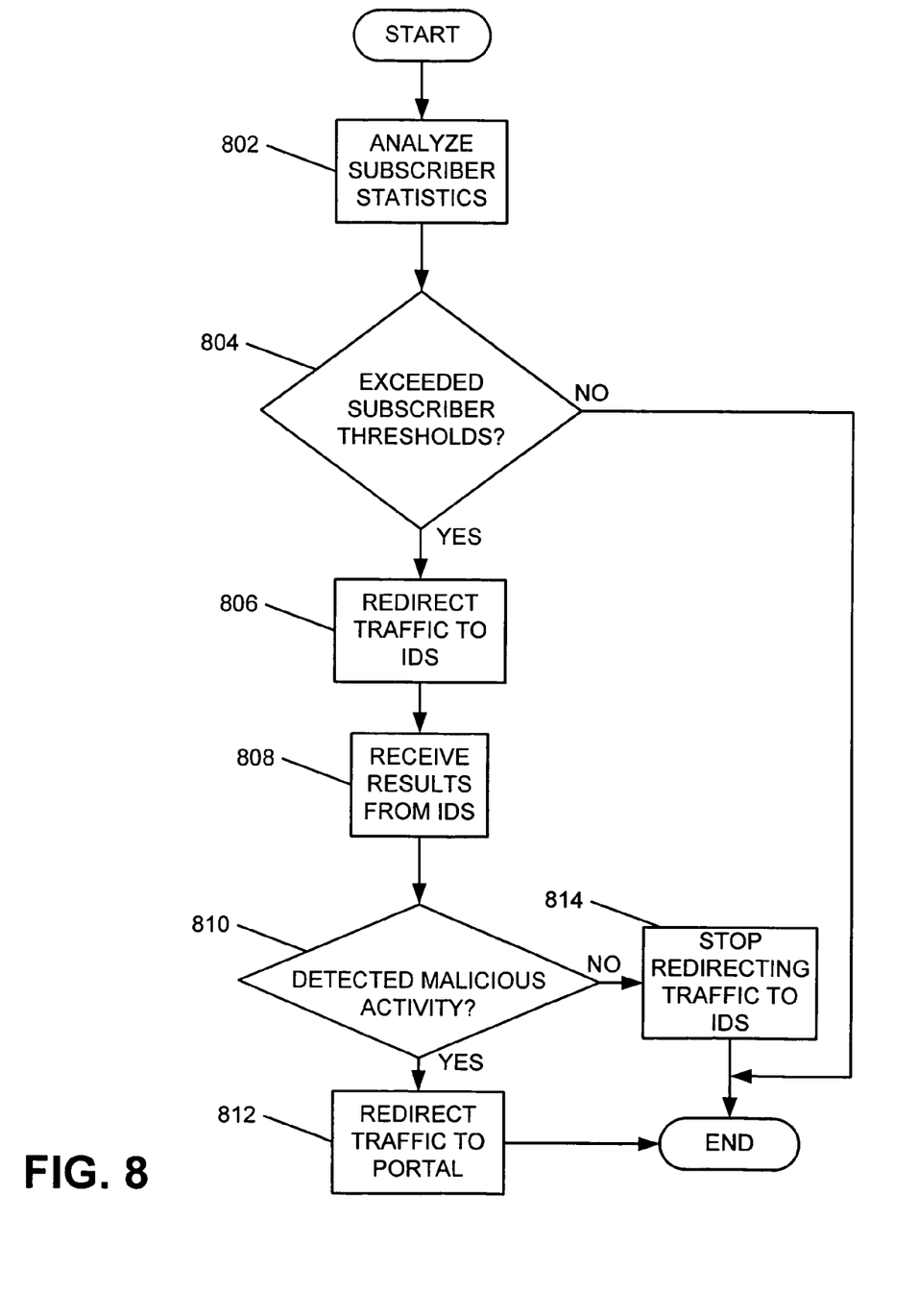
FIG. 8 is a flowchart that illustrates exemplary traffic volume checking of subscriber traffic in implementations consistent with the principles of the invention.

FIG. 8 is a flowchart that illustrates exemplary processing for checking traffic statistics. For the sake of this example, statistics collection and analysis are assumed to take place in SP 106.

Processing may begin by analyzing the collected statistics for a subscriber (act 802). SP 106 may then determine whether any subscriber thresholds have been exceeded (act 804). An exemplary threshold may be, for example, a threshold of 500 kilobytes over a two hour period or any other threshold value over a time period. If any traffic thresholds are exceeded, then SP 106 may cause the traffic from the subscriber to be redirected to intrusion security system 112 (act 806).

Intrusion security system 112 may receive and analyze the traffic to determine whether malicious activity (e.g., a virus, a worm, or any other malicious activity) within user device 110 is causing the high traffic volume. Intrusion security system 112 may send a malicious activity indication to SP 106. SP 106 may receive the malicious activity indication from intrusion security system 112 (act 808) and may check the malicious activity indication to determine whether any malicious activity was detected by intrusion security system 112 (act 810). If SP 106 determines that the malicious activity indication indicates that no malicious activity was detected, then SP 106 may stop redirecting traffic to intrusion security system 112 (act 814). Otherwise, SP 106 may redirect the subscriber's traffic to a web page or portal. The web page or portal may cause a message to be displayed at user device 110 informing the user that malicious activity has been detected on user device 110. In some implementations, the web page or portal may provide the user with an opportunity to purchase a security product, such as, for example, an antivirus product, a spyware product, or a firewall product. The user may also be granted limited access to network 102 or may be denied access until the user purchases and installs a security product or updates a currently installed and executing security product.

In some implementations consistent with the principles of the invention, SP 106 may redirect subscriber traffic to intrusion security system 112 at a particular time or according to a schedule, without necessarily checking for exceeded subscriber traffic thresholds. As discussed above, with respect to other implementations, when intrusion security system 112 detects malicious activity, SP 106 may redirect the subscriber traffic to a web page or portal for purchasing a security product or updating the security product. The web page or portal may provide the user with an opportunity to proceed with limited access, or may deny the user access to network 102.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while certain aspects have been described as implemented in software, other configurations may be possible.

While series of acts have been described with regard to FIGS. 3-5 and 8 the order of the acts is not critical. Moreover, non-dependent acts may be performed in parallel.

In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the implementations consistent with the principles of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the following claims and their equivalents.

What is claimed is:

1. A method implemented by a service provider, the method comprising:
 receiving, by a communication interface of the service provider, an access request to access a network from a first device;
 determining, by a processor of the service provider, whether a security check is to be performed on the first device;
 causing, by the processor of the service provider and when the security check is to be performed on the first device, the security check to be performed on the first device; and
 granting, by the processor of the service provider, the access request or redirecting, by the processor of the service provider, traffic from the first device based on a result of the security check.

2. The method of claim 1, where the redirecting includes:
 redirecting the traffic to a predetermined network location based on the result of the security check, the redirecting causing the first device to receive and display a page that permits a user to perform one of purchasing a security product based on the result of the security check, updating a security product based on the result of the security check or continue network access without purchasing or updating the security product.

3. The method of claim 1, where:
 the causing the security check to be performed on the first device comprises:
  installing security check software on the first device via the network,
  executing the security check software to perform the security check on the first device, and
  reporting the result of the security check by the first device.

4. The method of claim 1, further comprising:
 detecting, after granting access to the first device, a quantity of subscriber traffic exceeding a threshold; and
 redirecting the subscriber traffic to a security device when the quantity of the subscriber traffic exceeds the threshold.

5. The method of claim 4, further comprising:
 determining, by the security device, whether a malicious activity is occurring on the first device; and
 causing the first device to be redirected to a predetermined network location when a malicious activity is determined to be occurring on the first device.

6. The method of claim 5, where the causing the first device to be redirected to a predetermined network location includes providing a user with an option to purchase a security product or update a security product.

7. The method of claim 5, where the causing the first device to be redirected to a predetermined network location includes providing a user with an option to request access to the network.

8. The method of claim 7, where the access includes limited access.

9. The method of claim 1, further comprising:
 redirecting a subscriber's traffic to a security device according to a schedule.

10. A system for performing a security check of a user device, the system comprising:
 at least one device to:
  cause the security check to be performed on the user device, and
  cause traffic from the user device to be redirected when the security check indicates that the user device is not in conformance with a security policy, to present to a user, via the user device, an option to purchase or update a security product.

11. The system of claim 10, where the at least one device is further to:
 determine whether to perform the security check on the user device.

12. The system of claim 10, where the at least one device is further to:
 receive a result of the security check from the user device.

13. The system of claim 12, where the at least one device is further to:
 perform the security check by installing security software on the user device via a network, the security software to be executed by the user device.

14. The system of claim 12, where the at least one device is further to:

receive the result of the security check through a network.

15. The system of claim 10, where the at least one device is further to:

detect subscriber traffic exceeding a threshold, and cause the subscriber traffic to be redirected to a security device when the subscriber traffic is detected to exceed the threshold.

16. The system of claim 15, where the at least one device is further to:

receive a security processing result from the security device, and cause the traffic from the user device to be redirected to a portal based on the received security processing result.

17. The system of claim 10, where the at least one device is further to:

redirect a subscriber's traffic to a security device according to a schedule.

18. A system comprising:

a memory to store instructions; and a processor to execute the instructions to implement:

means for causing a security check to be performed on a user device before permitting the user device to access a network;

means for redirecting traffic from a user device when a result of a security check indicates that the user device is not in conformance with a security policy, and means for providing a user, via a user device, an option to purchase a security product, update a security product, or continue accessing the network without purchasing or updating the security product.

19. The system of claim 18, where the means for causing a security check to be performed further comprises:

means for installing security software on the user device via a network, and means for receiving an indication of a result of executing the security software on the user device.

20. The system of claim 18, where the processor further implements:

means for detecting subscriber traffic that exceeds a threshold, and means for causing the subscriber traffic to be redirected to a security device when the means for detecting detects that the subscriber traffic exceeds the threshold.

21. The system of claim 20, where the processor further implements:

means for receiving a security processing result from a security device; and means for causing traffic from a user device to be redirected based on a received security processing result.

22. The system of claim 18, where the processor further implements:

means for redirecting a subscriber's traffic to a security device according to a schedule.

23. A method performed by a service provider device, the method comprising:

receiving a network access request at the service provider device from a user device; and determining, via the service provider device, whether to grant the network access request based on a security scan of the user device.

24. A computer-readable memory device having instructions recorded thereon, the instructions comprising:

a first plurality of instructions to cause a processor to receive a network access request from a user device; and a second plurality of instructions to cause the processor to determine whether to grant the network access request based on a security scan of the user device.

25. A method performed by a service provider device, the method comprising:

receiving a network access request at a service provider device from a user device; and causing, via the service provider device, a security scan of the user device to be performed in response to receiving the network access request.

\* \* \* \* \*